United States Patent [19]

Suzuki et al.

[11] Patent Number: 4,954,701
[45] Date of Patent: Sep. 4, 1990

[54] FOCUS DETECTING APPARATUS PROVIDED WITH A PLURALITY OF DETECTING FIELDS

[75] Inventors: Kenji Suzuki; Keiji Ohtaka; Yasuo Suda, all of Yokohama, Japan

[73] Assignee: Canon Kabushiki Kaisha, Tokyo, Japan

[21] Appl. No.: 281,781

[22] Filed: Dec. 9, 1988

[30] Foreign Application Priority Data

Dec. 14, 1987 [JP] Japan ................. 62-315490

[51] Int. Cl.⁵ .................. G01J 1/20; G03B 3/00
[52] U.S. Cl. ................... 250/201.8; 354/406
[58] Field of Search ............... 250/201, 204; 354/406, 354/407, 408

[56] References Cited

U.S. PATENT DOCUMENTS

| | | | |
|---|---|---|---|
| 4,370,551 | 1/1983 | Fukuhara et al. | 250/204 |
| 4,373,791 | 2/1983 | Araki | 250/201 |
| 4,460,260 | 7/1984 | Utagawa | 250/201 |
| 4,497,561 | 2/1985 | Suzuki | 354/406 |
| 4,559,446 | 12/1985 | Suzuki | 250/204 |
| 4,563,576 | 1/1986 | Matsumura et al. | 250/204 |
| 4,573,784 | 3/1986 | Suzuki | 354/406 |
| 4,602,153 | 7/1986 | Suzuki | 354/408 |
| 4,618,236 | 10/1986 | Akashi et al. | 354/406 |
| 4,636,051 | 1/1987 | Shippey | 354/406 |
| 4,643,557 | 2/1987 | Ishizaki et al. | 354/406 |
| 4,670,645 | 6/1987 | Ohtaka et al. | 250/201 |
| 4,676,623 | 6/1987 | Akashi et al. | 354/408 |
| 4,699,493 | 10/1987 | Koyama et al. | 354/406 |
| 4,768,052 | 8/1988 | Hamada et al. | 354/406 |
| 4,774,539 | 9/1988 | Suda et al. | 354/406 |
| 4,792,669 | 12/1988 | Ohnuki et al. | 250/201 |
| 4,841,326 | 6/1989 | Koyama et al. | 354/408 |

FOREIGN PATENT DOCUMENTS

| | | |
|---|---|---|
| 58-142306 | 8/1983 | Japan . |
| 59-107313 | 6/1984 | Japan . |
| 60-101513 | 6/1985 | Japan . |
| 61-160824 | 7/1986 | Japan . |
| 0284526 | 11/1988 | Japan ................. 354/408 |

Primary Examiner—David C. Nelms
Assistant Examiner—Michael Messinger
Attorney, Agent, or Firm—Fitzpatrick, Cella, Harper & Scinto

[57] ABSTRACT

An apparatus for detecting the focus-adjusted state of an objective lens comprises a plurality of juxtaposed units each having a lens assembly for receiving light fluxes passed through different areas of the pupil of the objective lens and forming light intensity distributions whose relative position varies in conformity with the focus-adjusted state of the objective lens, and a plurality of photoelectric sensor arrays arranged in a direction orthogonal to the direction in which the areas are arranged for receiving the light intensity distributions and forming a signal indicative of the focus-adjusted state of the objective lens on the basis of the relative position of the light intensity distributions.

6 Claims, 6 Drawing Sheets

FOCUS DETECTING APPARATUS PROVIDED WITH A PLURALITY OF DETECTING FIELDS

BACKGROUND OF THE INVENTION

1. Field of the Invention

This invention relates to a focus detecting system in which scattered distance measuring points are disposed densely over a wide range in the photo-taking picture plane.

2. Related Background Art

As one type of the focus adjusting apparatus of a camera, there is known a method whereby the exit pupil of a photo-taking lens is divided into two by a focus detecting optical system, two object images formed by light fluxes passed through the pupil areas are received by photoelectric element arrays (for example, CCD sensor arrays), the focus state of the photo-taking lens is detected from the output thereof and the photo-taking lens is driven on the basis of the result of the detection.

Referring to FIG. 4 of the accompanying drawings, a field lens FLD is disposed coaxially with a photo-taking lens to be focus-detected. Two secondary imaging lenses FCLA and FCLB are disposed at positions rearward of the field lens and are symmetrical with respect to the optic axis. Further, sensor arrays SAA and SAB are disposed rearwardly of the secondary imaging lenses. Stops DIA and DIB are provided near the secondary imaging lenses FCLA and FCLB. The field lens FLD substantially images the exit pupil of the photo-taking lens LNS on the pupil surfaces of the two secondary imaging lenses FCLA and FCLB. As a result, light fluxes entering the secondary imaging lenses FCLA and FCLB, respectively, emerge from areas of equal dimensions on the exit pupil surface of the photo-taking lens LNS which correspond to the secondary imaging lenses FCLA and FCLB and which do not overlap each other. When an aerial image formed near the field lens FLD is re-imaged on the surfaces of the sensor arrays SAA and SAB by the secondary imaging lenses FCLA and FCLB, the two images on the sensor arrays SAA and SAB change their positions on the basis of the displacement of the position of the aerial image in the direction of the optic axis. Accordingly, if the amount of displacement (deviation) of the relative position of the two images on the sensor arrays is detected, the focus state of the photo-taking lens LNS can be known.

FIG. 5 of the accompanying drawings show an example of the photoelectric converted outputs of the two images formed on the sensor arrays SAA and SAB. The output of the sensor array SAA is $A(i)$. and the output of the sensor array SAB is $B(i)$. The number of picture elements of each sensor is at least five, and may desirably be several tens or more.

A signal processing method for detecting the amount of image deviation PR from the image signals $A(i)$ and $B(i)$ is disclosed by the assignee in Japanese Laid-Open Patent Application No. 58-142306, Japanese Laid-Open Patent Application No. 59-107313, Japanese Laid-Open Patent Application No. 60-101513 or Japanese Patent Application No. 61-160824.

By effecting the focus adjustment of the photo-taking lens on the basis of the amount of image deviation obtained by the method disclosed in these patent applications, the photo-taking lens can be brought into the in-focus state.

The method disclosed in the above-mentioned publications is such that for example, for the two image signals $A(i)$ and $B(i)$ ($i = 1, 2, \ldots, N$), $$V(m) = \sum_i \max\{A(i), B(i + k - m)\} - \sum_i \max\{a(i + k), k(i - m)\} \quad (1)$$

is calculated with respect to an integer value m. The range of i in which the sum is taken is determined from the condition that the suffixes i, i+k−m, i+k and i−m must be within a closed section [1,N]. k is an integer constant and usually, k=1. The range of m is concerned with the magnitude of the amount of image deviation to be detected and is not unconditionally determined, but usually m is varied within $$-\frac{N}{2} \lesssim m \lesssim \frac{N}{2}.$$

The amount of correlation defined by the equation (1) is an example and the following discussion is also equally applicable to the other known amount of correlation than this. Besides the equation (1), there are the following formulas as expressions representing the amount of correlation:

$$\sum \min\{A(i), B(i+k-m)\} - \sum \min\{A(i+k), B(i-m)\}$$

$$\sum |A(i) - B(i+k-m)| - \sum |A(i+k) - B(i-m)|$$

$$\sum |A(i) - B(+k-m)|^2 - \sum |A(+k) - B(i-m)|^2$$

The typical result obtained by calculating the above equation (1) with respect to each m is as shown in FIG. 6 of the accompanying drawings wherein the m at which $V(m)$ reverses its sign is the amount of image deviation expressed in picture element pitch units. Usually this value does not assume an integer. Assuming that reversal of the sign has occurred between $V(m_O)$ and $V(m_O+1)$, the amount of image deviation $M_O$ including a fraction can be calculated by $$M_o = m_o + |V(m_o)/\{V(m_o+1) - V(m_o)\}|.$$

A camera provided with a focus detecting apparatus of this type effects automatic focus detection for a distance measuring point usually placed like a spot in the central portion of the photo-taking picture plane. For example, in a single-lens reflex camera using 36 mm film, the length of the distance measuring field on the film-equivalent surface is usually of the order of 3–4 millimeters or less. The present Invention relates to a focus detecting apparatus in which the field of view capable of detecting the in-focus condition is wider and a portion thereof is designated in the fashion of a spot by a manual or automatic method and the in-focus condition is detected for the designated position in the picture plane.

The arrangement as described below is conceivable as the arrangement of the optical system or the sensor of a focus detecting apparatus having a wide distance measurement range. For example, it may be a system in which the field lens FLD and subsequent elements of the focus detecting optical system shown in FIG. 4 are generally enlarged. In this case, there is provided in advance a long distance measurement range as indicated by 43 in FIG. 7B of the accompanying drawings and an effective field length 44 for which the in-focus is calculated is selected from it. Detection of the in-focus condition is effected by the output of the photoelectric sensor corresponding to the same field length 44. Usually, the distance measurement range 43 includes the background other than the main object intended by the photographer and therefore, it is meaningless to calculate the in-focus condition to effect focus detection for the entire range 43 bY the use of the outPut of the whole photoelectric sensor, and it is also disadvantageous because the amount of calculation is enormous. FIG. 7A of the accompanying drawings shows the distance measuring field length 42 usually used in a prior-art automatic focus detection single-lens reflex camera relative to the picture plane size 41.

There can also be constructed a focus detecting optical system which has a PluralitY of the apparatuses of FIG. 1 in which the field length is conventionally set relatively short and in which the respective apparatuses correspond to different fields of view in the picture plane. Such an optical system is disclosed in Japanese Laid-Open Patent Applications Nos. 62-47612 and 62-189415.

On the other hand, the focus detecting optical system shown in FIG. 8 of the accompanying drawings is the inventor's tentative plan which has five distance measuring fields 51a, 51b, . . . , 51e in the picture plane 50 lying on a predetermined imaging plane and these fields are separately imaged by different secondary imaging lenses 52a, 53a and others, for example, the field 51a is separately imaged on sensor arrays 54a and 55a by the secondary imaging lenses 52a and 53a. If there is automatic or manual means for selecting any one of the different fields, there will be provided a focus detecting apparatus for designating the detected in-focus position from a wide range in the picture plane.

If an apparatus for selecting the distance measuring point from a wide picture plane range is constructed of the focus detecting optical system as described above, there will arise a great problem when carrying it in the interior of a compact optical instrument such as a portable single-lens reflex camera. For example, when an attempt is made to enlarge the field length of FIG. 7A, it is necessary that secondary imaging lenses maintain a sufficient imaging performance for a wide angle field of view. The optical system of a focus detecting system carried in the interior of a Portable camera is very small and therefore, it is difficult to adopt a complex lens construction to thereby widen the angle of view. Also, if the optical path length is made greater, the secondary imaging angle of view for the same field length is decreased, but again in this case, the total volume of the secondary imaging system is increased correspondingly to the increase in the optical path length, and this tends to be against the requirement for compactness. On the other hand, the apparatus of FIG. 8 requires adjustment of each of the juxtaposed secondary imaging systems and becomes very costly. Such an apparatus is difficult to make compact if adjusting members are individually added. In the heretofore known technique, there are a few requisite portions to be adjusted in a pupil divided image deviation detection focus detecting apparatus of the secondary imaging type, and it is incompatible with the requirement for compactness to carry the apparatus of FIG. 8 in into a camera.

The adjustment is already known or discussed in the Patent publication proposed by the assignee and therefore need not be described in detail, but the adjustment required for two pairs of sensor arrays to see the same area of the predetermined imaging plane is most delicate and requires adjustment accuracy of the order of 1 μm. The angle of tilt and the positioning of the optical member also unavoidably become considerably delicate because the entire system is small.

For such reasons, there has been desired a simple and compact focus detecting optical system which can direct object images in a wide range to the surface of the photoelectric sensor in a good imaged condition.

SUMMARY OF THE INVENTION

It is a first object of the present invention to provide a focus detecting apparatus which is capable of detection with respect to a plurality of distance measuring points.

It is a second object of the present invention to provide a compact and highly accurate focus detecting apparatus suitable for incorporation into a compact optical instrument.

It is a third object of the present invention to provide an apparatus which can detect not only a distance measuring point near the optic axis of an objective lens, but also a distance measuring point far from the optic axis with similar accuracy.

DESCRIPTION OF THE PREFERRED EMBODIMENTS

Figure 2:
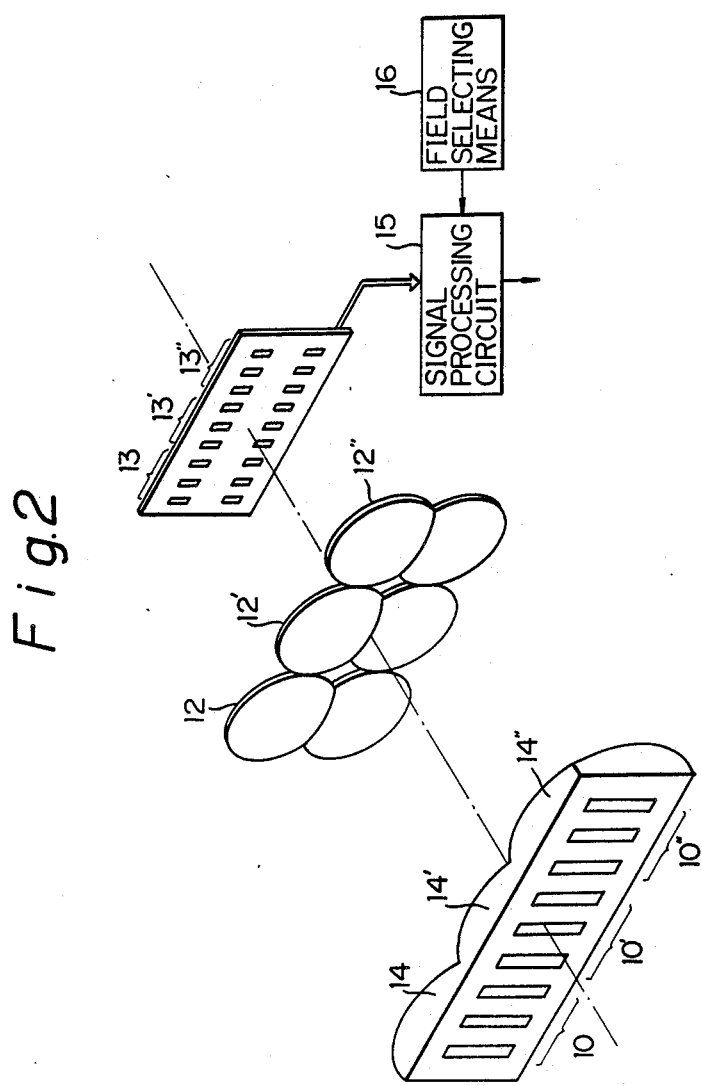
FIG. 2 is a perspective view showing an embodiment of the present invention.
Figure 3:
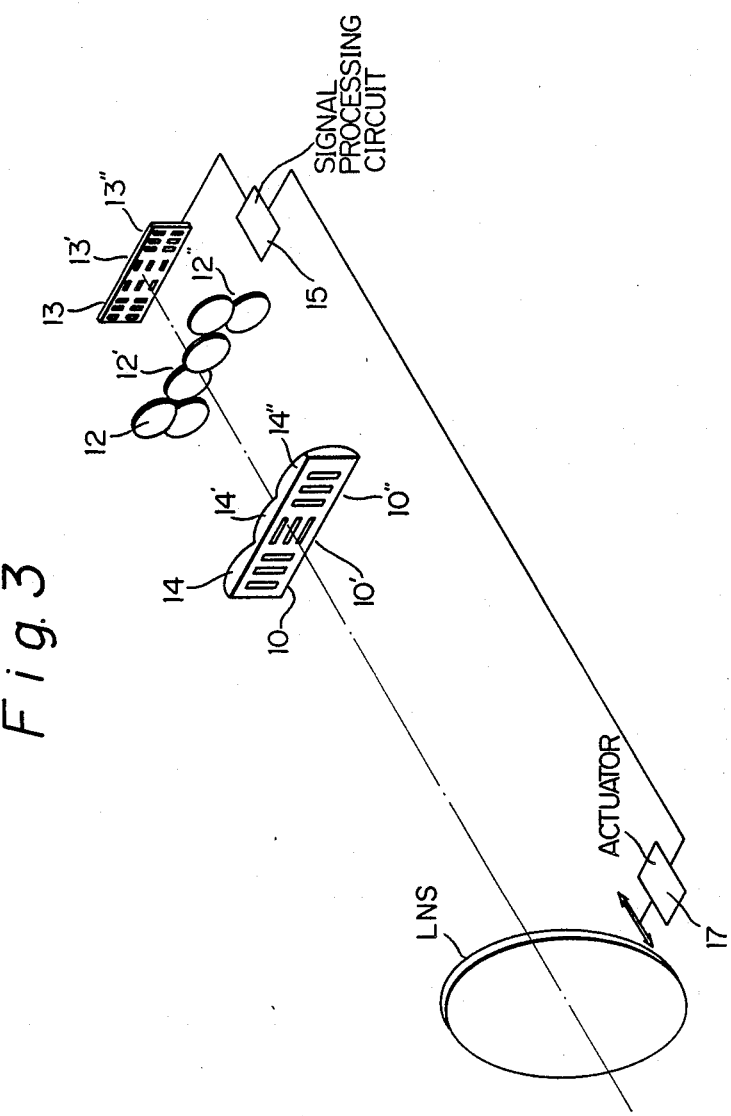
FIG. 3 is a perspective view showing another embodiment of the present invention.
Figure 4:
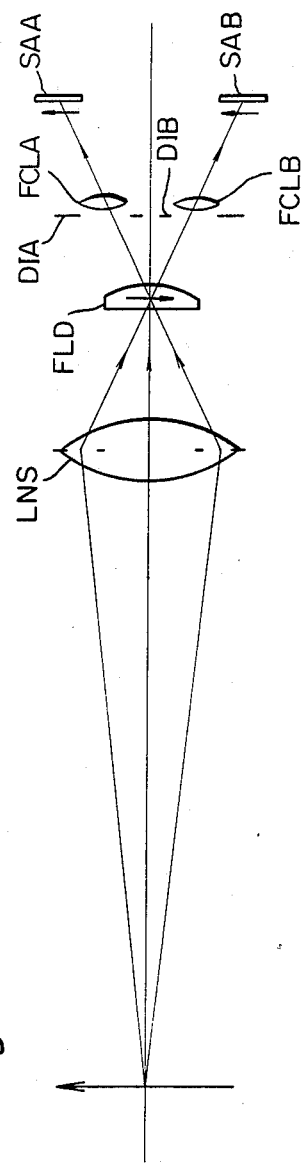
FIG. 4 is an optical cross-sectional view showing an example of the prior art.
Figure 5:
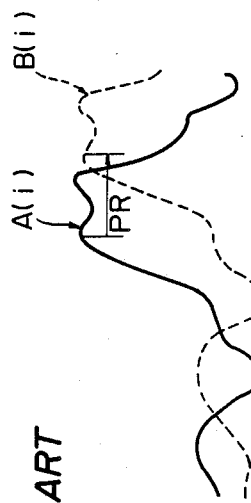
FIG. 5 is a graph showing light amount distributions.
Figure 6:
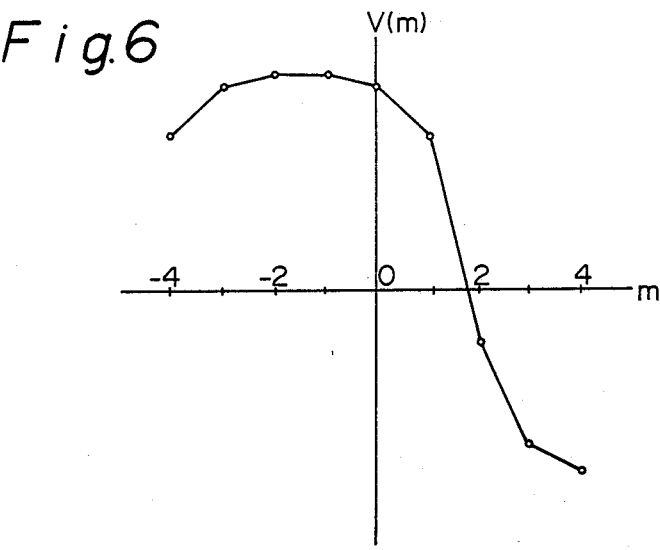
FIG. 6 is a graph showing a correlation signal.
Figure 7A:
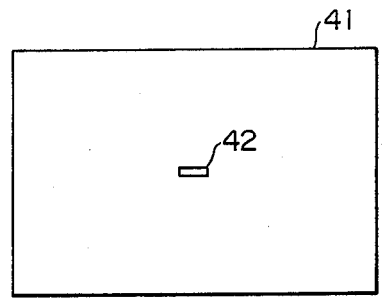
FIGS. 7A and 7B show the field of views in the finder.
Figure 7B:
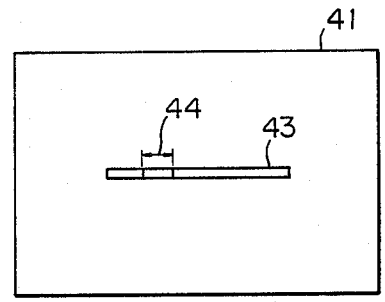
Figure 8:
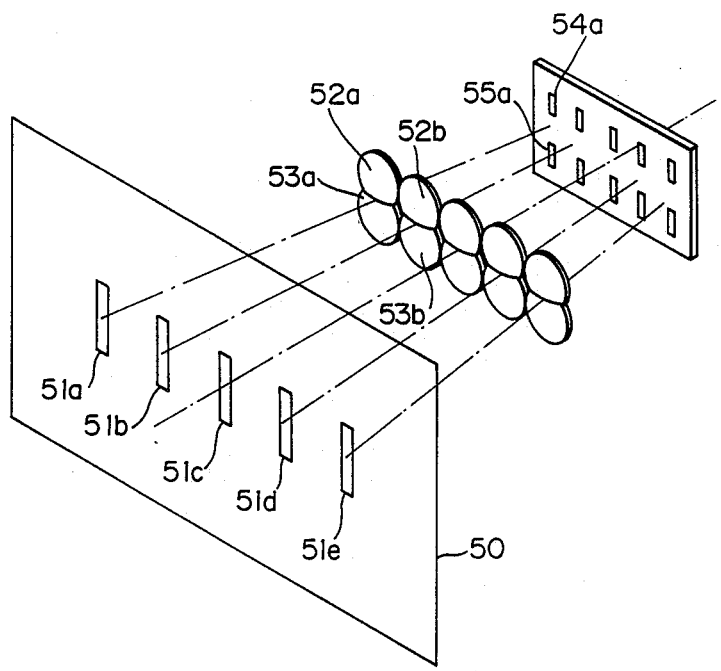
FIG. 8 is a perspective view showing a reference example of the arrangement.

Focus detecting apparatuses according to the present invention are shown in FIGS. 2 and 3, respectively. These apparatuses each comprise a plurality of juxtaposed units each having pupil dividing means for dividing the exit pupil of an objective lens into a plurality of different areas, light distribution forming means for receiving light fluxes passed through said areas and forming light distributions whose relative position varies in conformity with the focus-adjusted state of the objective lens, and photoelectric sensor arrays arranged in a plurality of rows in a direction orthogonal to the direction of pupil division by said pupil dividing means. Herein, the light is a concept including not only visible light, but also invisible light such as near-infrared light or infrared light.

Figure 1:
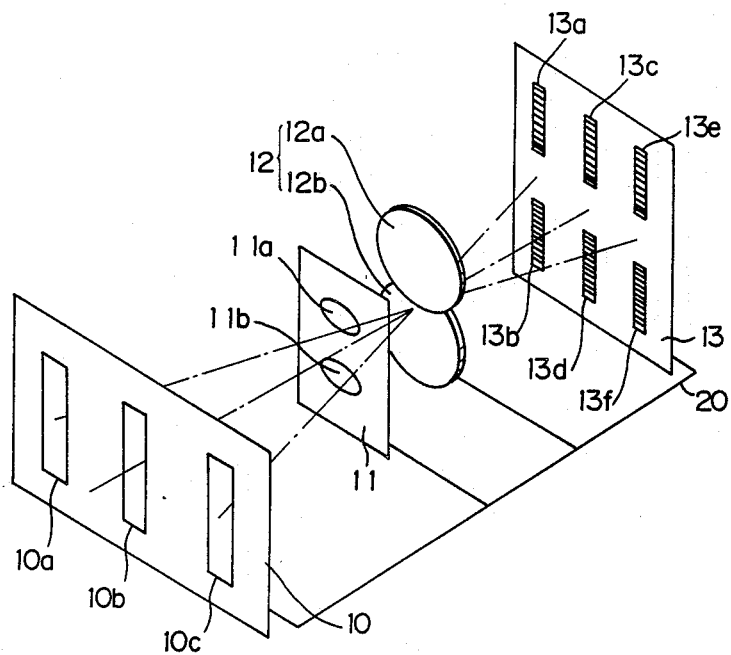
FIG. 1 is a perspective view showing the constituent units of an embodiment of the present invention.

FIG. 1 shows a focus detecting unit used in an embodiment of the present invention. In FIG. 1, the reference numeral 10 designates a field mask having rectangular openings 10a, 10b and 10c. These openings 10a, 10b and 10c each determine the distance measuring field. It is to be understood that the field mask 10 is disposed on or near the predetermined imaging plane of an objective lens, not shown. The reference numeral 11 denotes a two-aperture stop plate having openings 11a and 11b and having the function of dividing the exit pupil of the objective lens. Light fluxes passing through areas determined by the openings being reversely projected onto the exit pupil enter a photoelectric detector which will be described later.

The reference numeral 12 designates a set of secondary imaging lenses having positive lenses 12a and 12b. The set of secondary imaging lenses separates that portion of the object image which is limited, for example, by the opening 10a in a vertical direction as viewed in the figure and re-images it. The object images provided by the secondary imaging lenses has the interval therebetween varied in conformity with the focus-adjusted state of the objective lens. The two-aperture stop plate 11 and the set 12 of secondary imaging lenses are disposed in proximity to each other, but it is also possible to make the marginal edges of the secondary imaging lenses function also as a stop plate. Also, it is desirable to dispose a field lens near the field mask 10 and substantially image the two-aperture stop plate 11 on the exit pupil of the objective lens.

The reference numeral 13 denotes a photoelectric detector provided with pairs of sensor arrays 13a and 13b, 13c and 13d, and 13e and 13f in the direction of arrangement of the secondary imaging lenses 12a and 12b. The direction of arrangement of the pairs of sensor arrays 13a and 13b, 13c and 13d, and 13e and 13f is orthogonal to the direction of division of the exit pupil of the objective lens. Two ranges of one sensor array may be allotted instead of disposing the sensor arrays so as to form pairs. Each sensor array receives a light distribution based on the object image, and a signal corresponding thereto is output from the photoelectric detector 13.

The reference numeral 20 designates a schematically depicted framework which holds these components.

The number of distance measuring fields relating to one set of secondary imaging lenses need not necessarily be three, but is determined by the imaging magnifications of the imaging lenses 12a and 12b, the limit of the off-axial imaging performance thereof and how densely the sensor arrays arranged side by side can be disposed in a direction orthogonal to the direction of arrangement. What are important as the off-axial performance of the imaging lenses are asymmetric aberration and distortion. If there is asymmetric aberration, the center of gravity of the imaged spot differs from the principal ray and therefore an error occurs in the correlated calculated values of the two images, and the distortion corresponds to the disturbed uniformity of the coordinates unless it occurs in the same manner with respect to the two images at a pair of positions, and therefore an error is caused. In any case, in the area of Seidel aberration, it is an amount increasing or decreasing depending on the angle of view and particularly, distortion is proportional to the cube of the angle of view and therefore is greatly decreased by narrowing the angle of view even more or less. Also, where the sensor arrays are provided on a substrate, they function using not only a photoelectric converting unit but also a read-out circuit, an accumulation time control circuit, etc. disposed in proximity to one another and therefore, there is a limit to the density at which the sensor arrays can be provided parallel to one another.

The above-noted two points are the limit which restricts the number of fields which can be included in a focus detecting unit, and the disposition can be determined in design with these taken into account.

An embodiment of the present invention is constructed by providing a plurality of such focus detecting units side by side. For example, if three focus detecting units are arranged in the same direction of the distance measuring field as in the apparatus of FIG. 2, there can be constructed a focus detecting apparatus having a total of nine selective distance measuring fields.

The reference numerals 10, 10' and 10" correspond to the field mask 10 of FIG. 1, the reference numerals 12, 12' and 12" correspond to the set 12 of secondary imaging lenses, and the reference numerals 13, 13' and 13" correspond to the photoelectric detector 13. It is desirable that the three photoelectric detectors be made as a chip.

In FIG. 2, field lenses 14, 14' and 14" which are not depicted in FIG. 1 are added. The field lenses are provided to use the quantity of light effectively. The reference numeral 15 designates a signal processing circuit which is made capable of setting various modes such as a mode in which a signal from a sensor array corresponding to the field selected by field selecting means 16 is processed in accordance with a predetermined algorithm and the result is output as a signal indicative of the focus-adjusted state of the objective lens, and a mode in which outputs corresponding to all fields of view are successively calculated and the result of the calculation regarding the smallest object distance is output.

The above-described construction is constructed at a reasonable secondary imaging angle of view so as to be ready to provide the secondary imaging performance and is therefore optically excellent, and adjustment can be effected by the number of the focus detecting units and therefore, the labor required is little for the number of fields of view and the construction is not made bulky by an adjusting member.

FIG. 3 shows another example of the arrangement. In this example, one of the focus detecting units may be rotated by 90° so that even if the object is of a vertical pattern or a horizontal pattern, it can be detected accurately.

Designated by LNS is an objective lens. Field masks 10, 10', 10" and field lenses 14, 14', 14" are disposed near the predetermined imaging plane of the objective lens, and behind them, sets 12, 12', 12" of secondary imaging lenses and photoelectric detectors 13, 13', 13" are disposed so as to satisfy a predetermined optical condition. As shown, the field mask 10', the set 12' of secondary imaging lenses and the photoelectric detector 13' are provided at 90° relative to the others. The output from a circuit 15 for processing the signals from the photoelectric detectors is input to an actuator 17, and adjustment of the position in the direction of the optic axis of the objective lens LNS is effected.

The arrangement of the focus detecting units is not limited to these examples, but the merit of the present invention lies in that the focus detecting units can be arranged variously in conformitY with the object to be detected, the purpose of use, the structure of the camera, etc.

According to the present invention described above, there is the effect that focus detection becomes possible for objects lying in a wide range of the object field, and particularly there is the effect that the number of portions to be adjusted is small and assembly is simple and easy and yet a good optical performance can be achieved and moreover the apparatus can be constructed compactly.

We claim:

1. An apparatus for detecting a focus-adjusted state of an objective lens, comprising a plurality of juxtaposed units, each unit having:
   a lens assembly for receiving light fluxes passed through different areas of a pupil of the objective lens and forming light intensity distributions whose relative position varies in conformity with the focus-adjusted state of the objective lens; and
   a plurality of photoelectric sensor arrays disposed in a direction orthogonal to a direction in which said areas are arranged, for receiving the light intensity distributions and forming a signal indicative of the focus-adjusted state of the objective lens on the basis of the relative position of the light intensity distributions,
   said juxtaposed units being disposed in the same optical path.

2. An apparatus according to claim 1, wherein each of said units has a mask disposed near a predetermined imaging plane of said objective lens and provided with a plurality of apertures provided correspondingly to said photoelectric sensor arrays.

3. An apparatus according to claim 2, wherein each of said units has a field lens proximate to said mask.

4. An apparatus according to claim 1, wherein said units are disposed so that the photoelectric sensor arrays of all said units are parallel to one another.

5. An apparatus according to claim 1, wherein some of said units are disposed so that the photoelectric sensor arrays thereof are orthogonal to the photoelectric sensor arrays of the other unit.

6. An apparatus according to claim 1, wherein said photoelectric sensor arrays each comprise two subarrays.

* * * * *

UNITED STATES PATENT AND TRADEMARK OFFICE
CERTIFICATE OF CORRECTION

PATENT NO. : 4,954,701
DATED : September 4, 1990
INVENTOR(S) : Kenji Suzuki, et al.

It is certified that error appears in the above-identified patent and that said Letters Patent is hereby corrected as shown below:

COLUMN 1:

Line 50, "show" should read --shows--.

Line 53, "A(i)." should read --A(i),--.

COLUMN 2:

Line 32, "$\Sigma|A(i)-B(+k-m)|^2-\Sigma|A(+k)-B(i-m)|^2$"

should read

--$\Sigma|A(i)-B(i+k-m)|^2-\Sigma|A(i+k)-B(i-m)|^2$--.

Line 52, "Invention" should read --invention--.

Line 68, "in-focus" should read --in-focus condition--.

COLUMN 3:

Line 8, "range 43 bY" should read --range 43 by--, and "outPut" should read --output--.

Line 16, "PluralitY" should read --plurality--.

Line 64, "into" should be deleted.

Line 46, "Portable" should read --portable--.

Line 66, "Patent publication" should read --patent publications--.

UNITED STATES PATENT AND TRADEMARK OFFICE
CERTIFICATE OF CORRECTION

PATENT NO. : 4,954,701
DATED : September 4, 1990
INVENTOR(S) : Kenji Suzuki, et al.

It is certified that error appears in the above-identified patent and that said Letters Patent is hereby corrected as shown below:

COLUMN 4:

Line 62, "openings 10a, 10b and 10c." should read --openings 10a, 10b and 10c.--, and "openings 10a," should read --openings 10a,--.

Line 63, "10b and 10c" should read --10b and 10c--.

COLUMN 5:

Line 9, "opening 10a" should read --opening 10a--.

COLUMN 6:

Line 58, "conformitY" should read --conformity--.

COLUMN 8:

Line 14, change "the" to --an--

Signed and Sealed this

Twenty-first Day of April, 1992

Attest:

HARRY F. MANBECK, JR.

Attesting Officer     Commissioner of Patents and Trademarks